July 31, 1962   L. A. CORMIER   3,047,058
SHIELD FOR AUTOMOBILE
Filed Dec. 16, 1959

LOUIS A. CORMIER
INVENTOR.

BY
*Norman S. Blodgett*
ATTORNEY

United States Patent Office 3,047,058
Patented July 31, 1962

3,047,058
SHIELD FOR AUTOMOBILE
Louis A. Cormier, 42 Central St., Southbridge, Mass., assignor of fifty percent to Norman S. Blodgett, Westboro, Mass.
Filed Dec. 16, 1959, Ser. No. 859,931
4 Claims. (Cl. 160—45)

This invention relates to a shield for an automobile, and more particularly to a means for preventing rain from falling and obscuring the view through a windshield when the automobile is parked at a drive-in threater, or the like.

One of the difficulties experienced when attending a drive-in theater is that, if it rains during the moving picture performance, it is impossible to see through the windshield without turning on the windshield wipers. This means that the automobile motor must be running, which is not only expensive because of the consumption of gasoline, but dangerous because of the exhaust fumes. Furthermore, the use of windshield wipers does not leave the windshield perfectly clean and the movement of the wipers during the performance is distracting; furthermore, the wipers do not cover the full area of the windshield. Devices have been proposed in the past for protecting the windshield from the rain, but none of them have been entirely satisfactory, since in most cases they have involved considerable bulk, complicated and expensive apparatus, and partial failure of function. These and other difficulties experienced with the prior art devices have been obviated in a novel manner by the present invention.

It is, therefore, an outstanding object of the invention to provide a shield for an automobile which will keep the windshield free of rain when it is not desirable to operate the windshield wipers.

Another object of this invention is the provision of a shield for an automobile windshield which is capable of being folded into a very small package when not in use.

A further object of the present invention is the provision of a shield for an automobile windshield which requires no modification of the automobile body, which may be readily constructed from inexpensive materials, and which is capable of a long life of useful service.

It is another object of the instant invention to provide a canopy for an automobile windshield which can be securely fastened so that a strong wind will not blow it away.

With these and other objects in view, as will be apparent to those skilled in the art, the invention resides in the combination of parts set forth in the specification and covered by the claims appended hereto.

The character of the invention, however, may be best understood by one of its structural forms illustrated by the accompanying drawings in which.

Figure 1:
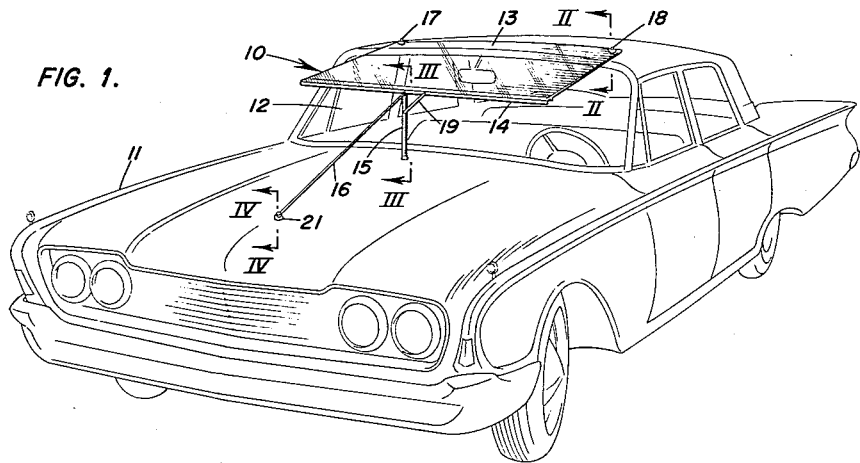
FIG. 1 is a perspective view of the invention in use with an automobile.

Referring first to FIG. 1, wherein are best shown the general features of the invention, the shield, indicated generally by the reference numeral 10, is shown in use with an automobile 11 having a windshield 12. The shield consists of a main canopy 13, a bar 14, a prop 15, and an elastic cord 16. The canopy 13 is formed of a flexible plastic material, such as polyethylene, or any other water-resistant flexible material. At its rearward end the two adjacent corners are each provided with a means for fastening them to the top of the automobile rearwardly of the windshield. This means, in the preferred embodiment, takes the form of suction cups 17 and 18. At the other end of the canopy it is attached to the rigid bar 14, which, in turn, has the prop 15 pivotally connected to its central portion. A brace 19 extends between the bar 14 and the prop 15 to hold them in rigid angular relationship with one another. The elastic cord 16 is connected at one end to the intersection beween the bar 14 and the prop 15, and at the other end it is attached to a suction cup 21.

Figure 2:
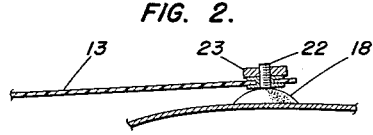
FIG. 2 is a sectional view of a portion of the invention taken on the line II—II of FIG. 1.

Referring to FIG. 2 which shows the suction cup 18, it can be seen that the suction cup is formed of rubber and is provided with an imbedded threaded member 22 which extends upwardly through an aperture in the flexible main canopy 13. On the other side of the canopy a nut 23 is passed over the threaded member and holds the canopy firmly united to the suction cup. Exactly the same construction is used in fastening the suction cup 17 to the other corner of the canopy.

Figure 3:
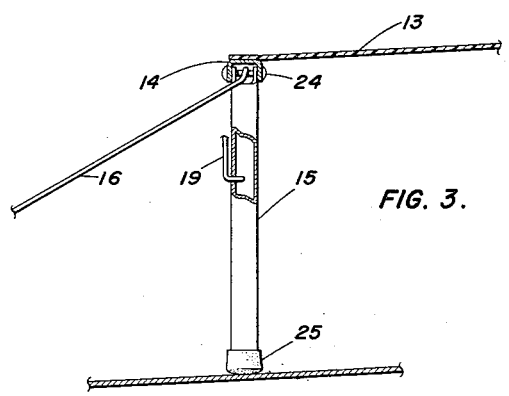
FIG. 3 is a sectional view of a portion of the invention taken on the line III—III of FIG. 1.

In FIG. 3 is can be seen that the bar 14 is in the form of a channel, preferably made of aluminum and the canopy 13 is fastened to the upper surface, the bar being arranged with the flanges extending downwardly. The canopy is fastened to the bar by cementing or other adequate means to prevent a separation between the two. The prop 15 is also formed from a length of channel-shaped aluminum, but its width is small enough to fit between the downwardly-extending flanges of the bar 14; a rivet 24 extends through the two of them to hinge them together. The brace 19 is formed of a heavy wire or rod, and each end is provided with a straight portion which extends through a suitable aperture in its respective bar or prop. The upper end of the elastic cord 16 is tied around the rivet 24 between the flanges of the prop 15. The prop 15 is provided with a rubber tip 25 to prevent marring the surface of the hood of the automobile 11 on which the prop rests.

Figure 4:
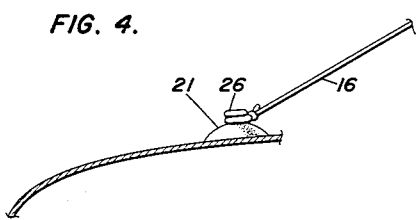
FIG. 4 is a sectional view of the invention taken on the line IV—IV of FIG. 1.

In FIG. 4 it can be seen that the lower end of the elastic cord 16 is tied to the suction cup 21 which is also formed of rubber or similar elastomeric material. Preferably, the suction cup is formed with a grooved knob 26 adapted to hold the cord in fixed relationship thereto.

The operation of the invention will be readily understood in view of the above description. When the owner of the automobile finds that it begins to rain in a drive-in theater, for instance, he has only to fasten the rearward end of the canopy 13 to the top of the automobile rearwardly of the windshild by use of the suction cups 17 and 18. Because of the curvature of the top of the automobile, this will produce a tight fit between the rearward edge of the canopy and the automobile to prevent water from running down between the canopy and the automobile under the windshield. As is quite clear from the above description, the prop 15 rests on the hood while the elastic cord 16 produces a forward tension to the suction cup 21 fastened to the hood. This elastic cord has the function of permitting a certain degree of flexibility to the system so that if wind gets under the canopy, it may sway slightly and prevent pulling the support free. Assuming that the canopy is made as wide as the windshield, there is little likelihood of rain falling on the windshield, even when an appreciable storm is taking place. When the shield is to be stored, it is only necessary to remove it from the automobile to unhook one end of the brace 19 from either the bar 14 or the prop 15 and fold the prop about its pivot point into the inside of the channel-formed bar 14. The elastic cord 16 and its suction cup may be laid in the bar 14 in between the flanges as a storage place, and, if desired, the brace 19 may be removed and placed in the bar. Then, the canopy 13 is rolled around the bar 14 until a neat, compact package is formed. This package, with the proper selection of materials, will occupy a space of not more than one inch in diameter and, of course, as long as the width of the windshield. The resulting package is not only compact, but there are no loose parts which might become lost.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A shield for an automobile, comprising a generally rectangular canopy formed of flexible, water-resistant material, means located at two adjacent corners to connect the said corners to the top of the automobile rearwardly of the windshield, a bar of channel form extending along the side opposite the said corners, a prop hingedly attached at one end to the center of the bar and adapted to extend downwardly into contact with the hood of the automobile, a rubber tip on the other end of the prop, a brace extending from a point on the prop spaced from the hinged connection to a point on the bar spaced from the hinged connection, the brace serving to hold the prop at a right angle to the bar, and an elastic cord attached at one end adjacent the center of the bar and adapted to be attached at the other end to the automobile forwardly of the top, the prop being hinged to the bar between the channel flanges and being narrower than the distance between the flanges so that it may be folded to a position within the bar for storage.

2. A shield for an automobile, comprising a generally rectangular canopy formed of flexible, water-resistant material, suction cups located at two adjacent corners to connect the said corners to the top of the automobile rearwardly of the windshield, a bar of channel form extending along the side opposite the said corners, a prop hingedly attached at one end to the center of the bar adapted to extend downwardly into contact with the hood of the automobile, a rubber tip on the other end of the prop, a brace extending from a point on the prop spaced from the hinged connection to a point on the bar spaced from the hinged connection, the brace serving to hold the prop at a right angle to the bar, and an elastic cord attached at one end adjacent the center of the bar and adapted to be attached to a suction cup at the other end of the automobile at a position forwardly of the top, the prop being hinged to the bar between the channel flanges and being narrower than the distance between the flanges so that it may be folded to a position within the bar for storage.

3. A shield for an automobile, comprising a generally rectangular canopy formed of flexible, water-resistant material, means located at two adjacent corners to connect the said corners to the top of the automobile rearwardly of the windshield, a bar of channel form extending along the side opposite the said corners, a prop hingedly attached at one end to the center of the bar and adapted to extend downwardly into contact with the hood of the automobile, a friction tip on the other end of the prop, a brace extending from the prop to the bar to hold the prop at a right angle to the bar, and a cord attached at one end adjacent the center of the bar and adapted to be attached at the other end to the automobile forwardly of the prop, the prop being hinged to the bar between the channel flanges and being narrower than the distance between the flanges so that it may be folded into position within the bar for storage.

4. A shield for an automobile, comprising a generally rectangular canopy formed of flexible, water-resistant material, means located at two adjacent corners to connect the said corners to the top of the automobile rearwardly of the windshield, a bar member extending along the side opposite the said corners, a prop member hingedly attached at one end to the center of the bar and adapted to extend downwardly into contact with the hood of the automobile, a friction tip on the other end of the prop, a brace extending from the prop to the bar to hold the prop at a right angle to the bar, and a cord attached at one end adjacent the center of the bar and adapted to be attached at the other end to the automobile forwardly of the prop, one of the two members being of channel form, the other member being hinged to the said one of the two members between the channel flanges and being narrower than the distance between the flanges so that it may be folded into position at least partly within the said one of the two members for storage.

References Cited in the file of this patent

UNITED STATES PATENTS

| | | |
|---|---|---|
| 1,515,466 | Dore | Nov. 11, 1924 |
| 2,064,393 | Talbott | Dec. 15, 1936 |
| 2,121,264 | Rubottom | June 21, 1938 |
| 2,508,757 | Gray | May 23, 1950 |
| 2,843,421 | Shelton | July 15, 1958 |
| 2,853,129 | Leavitt | Sept. 23, 1958 |
| 2,864,577 | Du Mais | Dec. 16, 1958 |